Patented Oct. 28, 1952

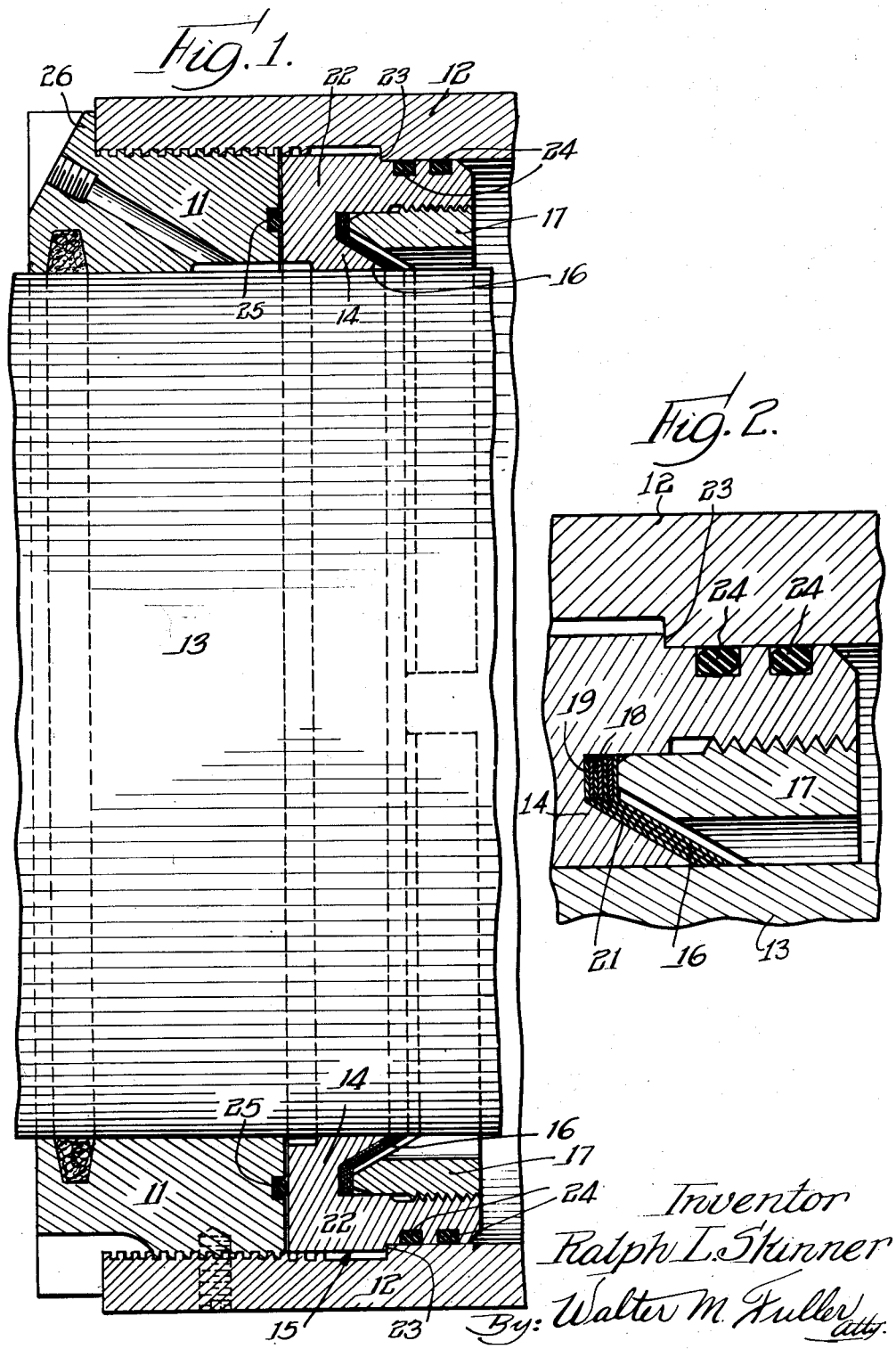

2,615,761

UNITED STATES PATENT OFFICE 2,615,761

PRESSURE SEALING CONSTRUCTION

Ralph L. Skinner, Detroit, Mich., assignor, by mesne assignments, to Robertshaw-Fulton Controls Company, Greensburg, Pa., a corporation of Delaware Application March 29, 1946, Serial No. 658,256

8 Claims. (Cl. 308—3.5)

The present invention concerns certain valuable and serviceable improvements in fluid-pressure sealing-means between relatively movable interfitting members particularly, but not necessarily exclusively, in appliances or structures designed or intended to be used for absorbing shocks or strains, an example of which would be the struts of airplane landing-wheels, or recoil mechanisms for artillery, etc.

In such and similar sealing-means subjected more or less to sidewise forces and pressures, the sealing structure is likely to wear unevenly and leak unduly early, and the present novel invention is designed and adapted to negative or neutralize such detrimental and destructive effects in substantial measure.

Among the objects of this invention may be stated the provision of means to seal fluid-pressure in a manner to perform such function or afford such service effectively and efficiently by means of constructions which are not unduly complicated, which are relatively economical to produce, which are unlikely to become injured or damaged in ordinary service, and which possesses reasonably long life.

To permit those acquainted with or skilled in this art to readily comprehend the structural and functional benefits accruing from the employment of this invention, a present preferred embodiment thereof has been illustrated in the accompanying drawing, forming a part of this specification, and to which reference should be had in connection with the following detailed description, like parts of the structure, as shown in the views of the drawing, for ease and simplicity, having been supplied with the same reference numerals.

In this drawing:

Figure 1 is a partial section through a cylinder-bearing and its piston or plunger incorporating this invention; and Figure 2 is an enlarged, fragmentary portion of Figure 1.

Referring to this drawing, it will be noted that a bearing-member 11 is threaded into the end-portion of the housing or cylinder 12 of any piston or plunger type of shock-absorbing means, such for example, as a 105 mm. recoil mechanism, the inner cylindrical surface of such bearing being concentric with that of the cylinder 12, the wear resulting from the pressure of holding the piston 13 occupying the bearing in alignment coming directly on the internal surface of the bearing.

After this surface has become worn, due to more or less constant relative reciprocation of the piston or plunger 13 and the bearing 11, it becomes somewhat eccentric in shape, and, in pressure-seals that have been made and used in such relations heretofore, the sealing-reeds have been rigidly fastened in the bearing and in edgewise engagement with the external surface of the plunger or piston, so that when the part 11 wore this would cause excessive pressure to be exerted on the reed-seal at the point where the most wear had taken place.

Such wear having occurred in the bearing-surface, there was the chance that the reed-seal would not contact properly with the piston and effect an efficient sealing function, and it was to overcome this outstanding difficulty that the present novel construction was evolved, this comprising an independent or supplemental bearing-member 14 of a slightly less external diameter than the inner surface of the cylinder 12 in which it fits or which it occupies.

The object of this diameter-difference, which is indicated at 15, is to permit the seal, which is installed in the cylinder, to follow the piston, or the cylinder if the reverse construction is employed, in the event wear or distortion might take place in the supporting member, the seal referred to comprising thin, nested, resilient, truncated-cone reeds 16 held in place in the bearing member 14 by an externally-threaded ring-clamp 17 bearing against the outer inactive portion 18 of the reeds and thereby holding the reeds against the shoulder 19, 21 of the member 14. The subassembly comprising the bearing member 14, the reeds 16 and the ring-clamp 17 thus form a pressure seal which may follow the cylinder 13 in any lateral movement it may take.

The lengthwise dimension of that part of member 14, characterized as 22 in Figure 1, is slightly less than the distance between the adjacent surface of bearing 11 and the shoulder designated 23 of cylinder 12 so as to afford the pressure seal of which the member 14 is a part a sort of free floating action, and to prevent the escape of any pressure because of this, the outer surface of member 14 as shown is provided with two recesses occupied by two static so-called O rings or gaskets 24, 24, and the adjacent surface of the bearing 11 is similarly recessed and occupied by a gasket 25. The position of the end wall of the bearing 11 adjacent the member 14 is determined by a radial flange 26 extending outwardly from the bearing 11 which abuts the end of the cylinder 12.

Member 14 is not screw-threaded on the outside but has a loose or floating fit permitting the pressure-seal to conform to any slight lateral movement of the piston or plunger and thus save undue wear on itself without, however, permitting the seal to leak.

Those skilled in and acquainted with this art will readily understand that this invention is not necessarily limited and restricted to the precise and exact details of construction and mode of operation illustrated and described and that reasonable modifications may be resorted to without departure from the heart and essence of the invention, as defined by the appended claims, and without the loss or sacrifice of any of its material benefits and advantages.

I claim:

1. A fluid-pressure sustaining appliance comprising a cylinder, a bearing screwed into an end of said cylinder, a piston initially fitting accurately in said bearing, and a pressure-seal mounted in said cylinder alongside said bearing and encircling said piston, said pressure-seal having a slight play transversely of the bearing to allow the seal to conform to relative lateral movement between the cylinder and piston, said pressure seal including a resilient truncated-cone reed-type element surrounding and edgewise engaging the piston, said pressure seal in addition having a gasket-seal between itself and said bearing, and another gasket-seal between itself and said cylinder.

2. The construction set forth in claim 1, in which said bearing has a radial flange bearing against the end of said cylinder.

3. A pressure-sealing construction comprising relatively movable inner and outer members; a bearing interposed between said members and supporting one of the members during movement thereof; and a free-floating pressure seal mounted between said members at one end of the bearing, said seal having resilient, annular, truncated-cone, reed-type elements in edgewise engagement with one of said members, and annular resilient sealing means compressed between the seal and the other of said members.

4. A pressure-sealing construction comprising relatively movable concentric inner and outer members having an annular space therebetween; an annular bearing disposed in said space to sustain wear resulting from relative movement between the members; and an annular pressure seal disposed in the space adjacent to the bearing, said seal having an annular body portion of greater internal diameter than the inner member and of lesser external diameter than said outer member so as to be free-floating transversely of the members; resilient, annular, truncated-cone, reed-type elements carried by the body portion and in edgewise engagement with one of said members; and annular resilient sealing means compressed between said body portion and the other of said members.

5. A pressure-sealing construction comprising relatively movable inner and outer members; a bearing interposed between said members and supporting one of the members during movement thereof; and a free-floating pressure seal mounted between said members at one end of the bearing, said seal having resilient, annular, truncated-cone, reed-type elements in edgewise engagement with one of said members, annular resilient sealing means compressed between the seal and the other of said members, and other annular resilient sealing means compressed between the seal and said bearing.

6. A pressure-sealing construction comprising relatively movable concentric inner and outer members having an annular space therebetween; an annular bearing disposed in said space to sustain wear resulting from relative movement between the members; and an annular pressure seal disposed in the space adjacent to the bearing, said seal having an annular body portion of greater internal diameter than the inner member and of lesser external diameter than said outer member so as to be free-floating transversely of the members, resilient, annular, truncated-cone, reed-type elements carried by the body portion and in edgewise engagement with one of said members, annular resilient sealing means compressed between said body portion and the other of said members, and other annular resilient sealing means compressed between the body portion of the seal and said bearing.

7. A pressure-sealing construction comprising a stationary outer cylindrical member; an inner member reciprocable in said outer member; a bearing interposed between said members connected to the outer member and slidably supporting said inner member; and an annular free-floating pressure seal mounted between said members adjacent to the bearing, said seal having resilient, annular, truncated-cone, reed-type elements in edgewise sealing engagement with said inner member, and annular resilient sealing means compressed between the seal and said outer member.

8. A pressure-sealing construction comprising a stationary outer cylindrical member; an inner member reciprocable in said outer member; a bearing interposed between said members connected to the outer member and slidably supporting said inner member; and an annular free-floating pressure seal mounted between said members adjacent to the bearing, said seal having resilient, annular, truncated-cone, reed-type elements in edgewise sealing engagement with said inner member, annular resilient sealing means compressed between the seal and said outer member, and annular resilient sealing means compressed between the seal and said bearing.

RALPH L. SKINNER.

REFERENCES CITED

The following references are of record in the file of this patent:

UNITED STATES PATENTS

| Number | Name | Date |
| --- | --- | --- |
| 2,182,226 | Geise | Dec. 5, 1939 |
| 2,385,045 | Wallace | Sept. 18, 1945 |